United States Patent [19]
Kawai

[11] 3,965,874
[45] June 29, 1976

[54] IGNITION TIMING CONTROL APPARATUS

[75] Inventor: Noriaki Kawai, Okazaki, Japan

[73] Assignee: Toyota Jidosha Kogyo Kabushiki Kaisha, Toyota, Japan

[22] Filed: Dec. 19, 1974

[21] Appl. No.: 534,469

[30] Foreign Application Priority Data
July 9, 1974    Japan.............................. 49-080295

[52] U.S. Cl............................................. 123/117 A
[51] Int. Cl.²............................................. F02P 5/04
[58] Field of Search................................. 123/117 A

[56] References Cited
UNITED STATES PATENTS

| | | | |
|---|---|---|---|
| 3,400,698 | 9/1968 | Kelly................. | 123/117 A |
| 3,631,845 | 1/1972 | Walker et al.......... | 123/117 A |
| 3,650,253 | 3/1972 | Cooksey.............. | 123/117 A |
| 3,727,596 | 4/1973 | Panhard.............. | 123/117 A |
| 3,780,713 | 12/1973 | Julian............... | 123/117 A |

*Primary Examiner*—Wendell E. Burns
*Assistant Examiner*—James W. Cranson
*Attorney, Agent, or Firm*—Stevens, Davis, Miller & Mosher

[57] ABSTRACT

An ignition timing control apparatus for an internal combustion engine which includes two diaphragms, each of which is selectively connected through a change-over valve to a respective one of two vacuum ports in the passage of carburetor. One of the ports is just above the upper edge of a throttle valve in the fuel passage when the throttle valve is in its engine idling position. The other port is upstream of the one port and is adjacent the upper edge of the throttling valve when the engine is in a partly loaded condition. The change-over valve is controlled in response to the temperature of the engine cooling water. When the engine is cold-operation or warming-up, one of the diaphragms communicates with one of the vacuum ports through the change-over valve to advance the ignition timing in response to the vacuum in the passage of carburetor; and when the engine is in a condition other than cold-operation or warming-up, the other diaphragm communicates with the other vacuum port through the change-over valve to advance ignition timing in response to the vacuum, which under low and high load conditions may be approximately atmospheric pressure, in the fuel passage.

3 Claims, 1 Drawing Figure

U.S. Patent June 29, 1976 3,965,874
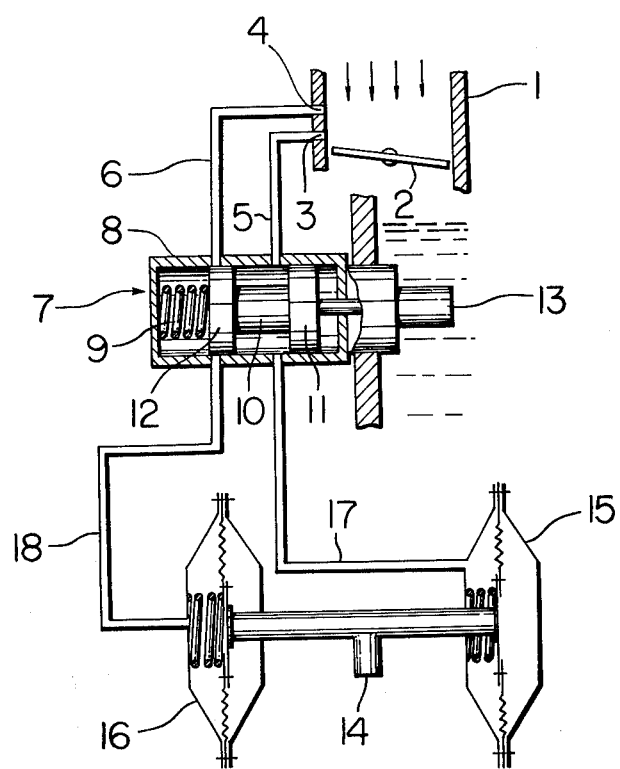

IGNITION TIMING CONTROL APPARATUS

BACKGROUND OF THE INVENTION

1. Field of the Invention

This invention relates to ignition timing control apparatus for an internal combustion engine, or more particularly to ignition timing control apparatus having means retarding ignition timing so as to decrease toxic components, especially nitrogen oxides and hydrocarbons, contained in exhaust gas.

2. Description of the Prior Art

In ignition timing control apparatus of conventional types, retardation of ignition timing has been effected by cutting off the vacuum introduction into the vacuum advancer from a carburetor, during ordinary operation conditions, that is, other than during the warming-up and cold operations.

On the other hand, it is desirable to change the degree of ignition timing retardation with the level of vacuum from the suction pipe, because the reaction rate of the fuel/air mixture generally changes with the vacuum.

However, the conventional retarding mechanism, established by only cutting off the introduction of vacuum into the vacuum advancer from the carburetor, does not change the degree of retardation in accordance with changing vacuum. Therefore, if such apparatus is so designed as to provide the best suited retardation under high load condition, not optimum but excessive retardation will result under medium load conditions.

SUMMARY OF THE INVENTION

An object of this invention, accordingly, is to provide ignition timing control apparatus of such type that always produces the best suited retarded condition by changing the degree of ignition timing retardation in accordance with the amount of vacuum supplied from the suction pipe.

Now an embodiment of this invention will be described in detail with reference to the accompanying drawing.

BRIEF DESCRIPTION OF THE DRAWING

The accompanying FIGURE is a system diagram of an ignition timing control apparatus according to this invention.

DESCRIPTION OF THE PREFERRED EMBODIMENT

Structural features of the apparatus will be discussed first.

There is provided a throttle valve 2 in a carburetor 1, with two vacuum ports being opened into the inner wall of said carburetor 1. A first port 3 is provided at a portion of the inner wall of the carburetor 1 that is just above the upper edge of the throttle valve 2 in an idling condition. A second port 4 is provided on the upstream side of the first port 3, and adjacent to a portion of the wall of the carburetor 1 that is opposite to the upper edge of the throttle valve 2 in a partly loaded condition. The first port 3 and the second port 4 communicate with a change-over valve 7 through pipes 5 and 6, respectively. The change-over valve 7 comprises a valve body 10 which reciprocatingly slides inside a cylinder 8 against the force of a spring 9, with said valve body 10 having two lands 11 and 12. The valve body 10 is driven by a member 13 operated by cooling water. The member 13 contains a piston which is driven by a wax which expands when heated. The piston is connected to the valve body 10 to move it when the wax expands. A first diaphragm means 15 and a second diaphragm means 16 adapted to drive an advancer drive 14 connected to a distributor of the internal combustion engine, not shown, are connected to said change-over valve 7 by pipes 17 and 18, respectively.

Now the following paragraphs describe the operational phase of the ignition timing control apparatus according to this invention as described above.

When the engine has been just started, or when it has not been fully warmed up, or when it is under extremely cold weather condition, the temperature of cooling water is low, and therefore the wax in the member 13 does not expand and the member 13 does not move the valve body 10 against the force of spring 9. Consequently, the land 12 cuts off the communication between the pipes 6 and 18, while the pipes 5 and 17 are communicated with each other. Then, vacuum from the carburetor detected at the first port 3 is transmitted to the first diaphragm means 15 through the pipe 5, the change-over valve 7 and the pipe 17. Because the first diaphragm means 15 is designed to advance ignition timing by the ordinary vacuum from the suction pipe, it functions as described above when the engine is still at low temperature, thus operating the advancer drive 14 so as to achieve the best suited ignition timing advancing.

When the engine has been sufficiently warmed up, the temperature of engine cooling water rises, and the wax in the member 13 expands to drive the piston in the member 13 to move the valve body 10 against the force of the spring 9. As a consequence, the land 11 cuts off the communication between the pipes 5 and 17, while, on the other hand, the pipes 6 and 18, whose communication was cut off by the land 12, are communicated with each other again. Therefore, vacuum from the suction pipe detected at the second port 4 is transmitted to the second diaphragm means 16, through the pipe 6, the change-over valve 7, and the pipe 18. However, the throttle valve 2 opens to its full extent when the engine is operated under high load and, therefore, the vacuum detected at the second port 4 becomes approximately equal to atmospheric pressure, because the second port 4 is provided in such a portion of the inner wall of the carburetor 1 that is opposite to the upper edge of the throttle valve 2 under a partly loaded condition, as described previously. Under medium-load conditions (i.e., a partly loaded condition so that the upper edge of throttle valve is situated on the position opposing to the port 4), the second port 4 opens into the narrowest passage in the carburetor 1, thereby detecting and transmitting vacuum to the second diaphragm means 16, so as to advance the ignition timing to a predetermined extent. Furthermore, under light-load conditions (i.e., when the throttle valve is situated on the downstream side of the port 4), the throttle valve 2 becomes almost closed and the second port 4 is on the upstream side of the upper edge of the throttle valve 2, and, therefore, the vacuum detected at the second port 4 becomes approximately equal to atmospheric pressure.

As described above, the second diaphragm means 16 according to this invention functions, under medium-load conditions, to advance ignition timing in accordance with the vacuum from the carburetor, scarcely operating under a high and low load conditions. By this means, the invention insures prevention of excessive retardation of ignition timing under medium load conditions which has heretofore been experienced. Also, the invention provides a solution to the problem of output shortage and an improvement of operating performance during medium load operation. In addition, the second diaphragm means 16 is provided separate from the first diaphragm means 15 to achieve the control of ignition timing advancing under the medium load conditions. Accordingly, its advancing characteristic is easy to design, and the best suited characteristic can be obtained.

Although, the foregoing description has dealt with the internal combustion engine having a carburetor, this invention is also applicable to internal combustion engine of the gasoline injection type. Furthermore, the change-over valve of this invention is not limited to a thermo-valve of the type used in the above-described embodiment. Rather, any change-over valve that is operated by suitable detecting means, which is capable of detecting the operating condition of the engine, can of course be used.

What is claimed is:

1. Ignition timing control apparatus for an internal combustion engine comprising:
   a first diaphragm means and a second diaphragm means, said first and second diaphragm means each individually controlling an advancer drive connected to a distributor,
   a change-over valve,
   means responsive to the operating condition of the engine for controlling the change-over valve,
   a first vacuum port opening into a suction pipe of said engine and detecting the vacuum in accordance with an operating condition of said engine,
   a second vacuum port opening into said suction pipe at the upstream side of said first vacuum port and detecting the vacuum which is less than the vacuum detected at said first vacuum port and may be substantially zero under low and high load operating conditions of said engine; and
   said change-over valve fluidly interconnecting said first diaphragm means with said first vacuum port in the suction pipe and not fluidly interconnecting said second diaphragm means with said second vacuum port in the suction pipe when the engine is in cold operation or warming up so that when the engine is in cold operation or warming up said first diaphragm means communicates with said first vacuum port through said change-over valve to advance ignition timing in response to the vacuum from said first vacuum port, and said change-over valve fluidly interconnecting said second diaphragm means with said second vacuum port in the suction pipe and not fluidly interconnecting said first diaphragm means with said first vacuum port in the suction pipe when the engine is in a condition other than cold operation or warming up so that when the engine is in a condition other than cold operation of warming up said second diaphragm means communicates with said second vacuum port through said change-over valve to advance ignition timing in response to the vacuum from said second vacuum port.

2. In an ignition timing control apparatus for an internal combustion engine as claimed in claim 1, said first vacuum port in the suction pipe opens just above the upper edge of the throttle valve when the engine is idling and said second vacuum port opens upstream of said first vacuum port adjacent the upper edge of the throttling valve when the engine is in a partly loaded condition.

3. In an internal combustion engine as claimed in claim 2, wherein:
   said change-over valve comprises
     a cylindrical body having a first and a second pair of openings therein, and
     a valve body slidable in said cylindrical body, said valve body having first and second portions adapted to selectively block said first and second pair of openings respectively, and
   a first duct connects one of said first pair of openings with said first vacuum port and a first conduit connects the other of said first pair of openings with said first diaphragm means, and
   a second duct connects one of said second pair of openings with said second vacuum port and a second conduit connects the other of said second pair of openings with said second diaphragm means.

* * * * *